United States Patent [19]

Amundsen et al.

[11] Patent Number: 5,265,690

[45] Date of Patent: Nov. 30, 1993

[54] VEHICLE FRAME WITH INDEPENDENT SEAT FRAME

[75] Inventors: L. Carl Amundsen; Randal C. Amundsen, both of Albany; William D. Rowland, Sylvester, all of Ga.

[73] Assignee: A & R Research Corporation, Albany, Ga.

[21] Appl. No.: 812,025

[22] Filed: Dec. 23, 1991

[51] Int. Cl.⁵ .............................................. B62D 23/00
[52] U.S. Cl. ..................... 180/89.1; 180/311; 280/781; 296/65.1
[58] Field of Search ............... 180/89.13, 908, 311, 180/89.1; 280/104, 793, 255, 181; 296/65.1

[56] References Cited

U.S. PATENT DOCUMENTS

| | | | |
|---|---|---|---|
| 3,115,350 | 12/1963 | Quick, Jr. | 280/106 |
| 3,459,436 | 8/1969 | Rusconi | 280/104 |
| 3,584,892 | 6/1971 | Moore | 280/104 |
| 4,106,789 | 8/1978 | High | 280/793 |
| 4,614,358 | 9/1986 | Wymann | 280/689 |
| 4,896,899 | 1/1990 | Lawrence | 280/775 |

Primary Examiner—Richard M. Camby
Attorney, Agent, or Firm—Fitzpatrick, Cella, Harper & Scinto

[57] ABSTRACT

A go cart racing frame comprises a chassis having a right front portion, a left portion, a right rear portion and a left rear portion and having left and right sides, an independent seat frame for supporting a seat rigidly connected to the chassis at a plurality of weight-bearing points, and a seat frame restricter for restricting downward movement of the seat frame with respect to the chassis. The weight-bearing points concentrate the weight of the driver positioned in the seat at the left front portion and right rear portion of the chassis. The seat frame restricter forms an additional weight-bearing point when downward force is applied to the seat frame for helping to support the weight of the driver and distributing it to the left rear portion of the chassis. However, the restricter allows upward movement of the independent seat frame.

45 Claims, 4 Drawing Sheets

VEHICLE FRAME WITH INDEPENDENT SEAT FRAME

BACKGROUND OF THE INVENTION

1. Field of the Invention

The present invention relates to a vehicle frame having an independent seat frame. More particularly, the invention relates to a motorized go cart racing frame with an independent seat frame mounted thereon to concentrate the weight of a driver at selected locations of the racing frame.

2. Description of the Prior Art

The sport of go cart racing typically involves a plurality of motorized go carts racing one or more times around a track, with the object being to cross a predetermined finish line ahead of the other go carts. Go cart race tracks are traditionally oval in shape, and the go carts race in a counterclockwise direction. On an oval track, therefore, the go carts must continuously negotiate tight left hand corners. Race tracks in shapes other than ovals are also used for racing, but these tracks are usually designed to have left hand turns while having usually wider right hand turns. The surface of the racing tracks can vary and can be made of, for example, dirt, clay or asphalt. In addition, many tracks use banked curves to allow the go carts to travel at higher speeds. The racing speeds of the motorized go carts can reach over 100 mph.

Figure 1:
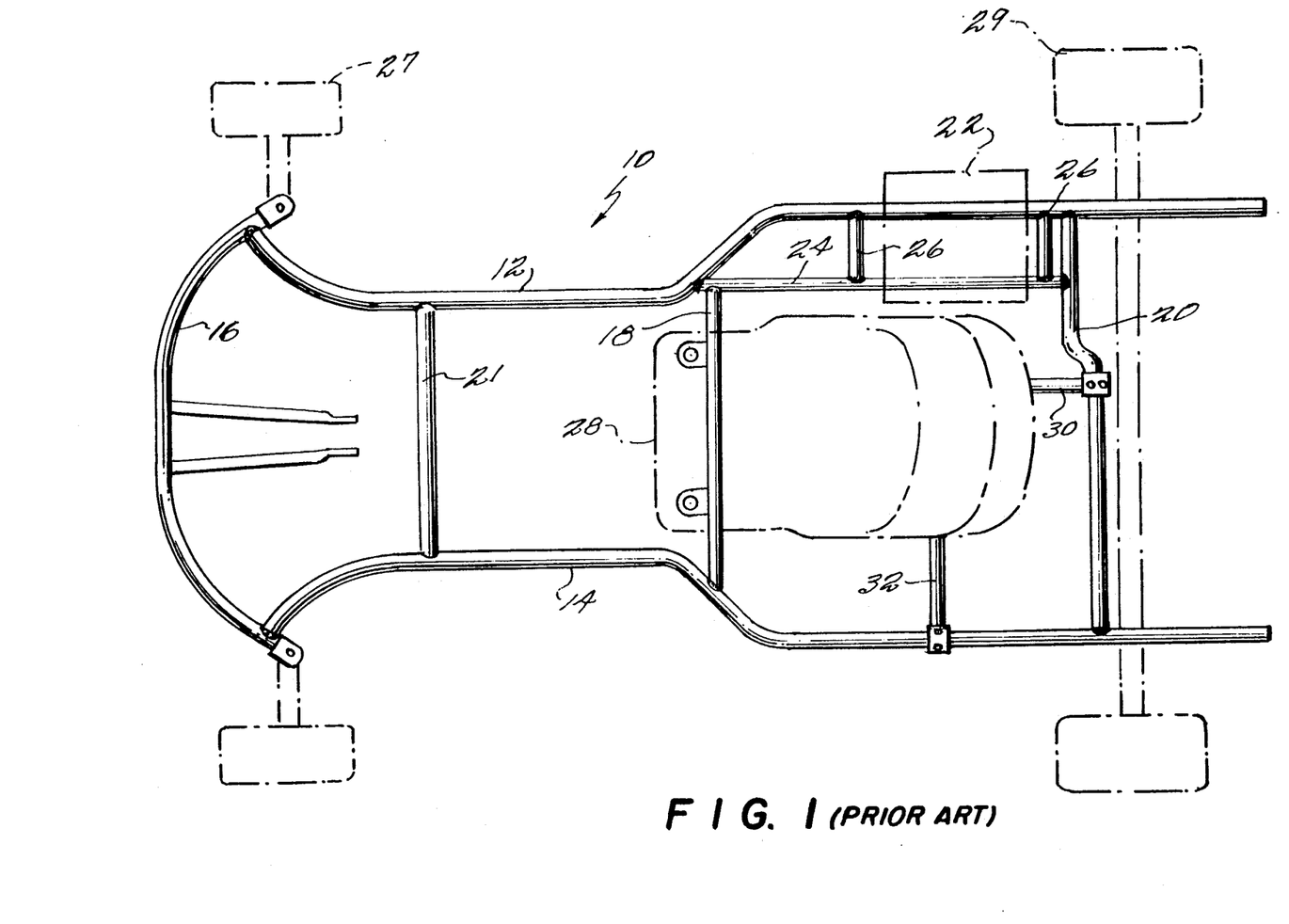
FIG. 1 is a top plan view of a conventional go cart frame.

The basic components of a go cart are well known in the art. A conventional go cart frame 10 is shown in FIG. 1 and is typically comprised of 1'⅛ thin-wall tubing welded together at all joints. Two extended frame members 12 and 14 form the sides (right and left, respectively, from the driver's perspective) of the vehicle frame, or chassis. The extended frame members are weld-connected together by front, middle and rear transverse frame members 16, 18 and 20, respectively. A flat bar 21 is secured between the extended frame members to support a floor board (unshown). The motor 22 is usually mounted on the right rear portion of the chassis for reasons that will be discussed below. The chassis shown in FIG. 1 includes a motor-supporting member 24 and brackets 26 for helping to support the motor.

A seat 28 is rigidly secured to middle transverse frame member 18 and includes adjustable rear and side seat supports 30 and 32 attached to the chassis. The supports are adjusted to balance the weight of the go cart and the driver to achieve approximately equal weight distribution on the left and right sides of the chassis. Seat 28 in FIG. 1 is also positioned slightly left of center to offset the weight of the motor on the right side. The go cart is conventionally designed to have approximately 40% of the weight supported on front wheels 27 and approximately 60% of the weight supported on rear wheels 29.

Since go cart racing tracks are configured to have predominantly left hand turns, an ongoing objective is to design go carts which can negotiate left hand turns at higher and higher speeds. This objective is particularly challenging because go carts use a live rear axle. The live axle rotates both rear wheels at the same speed at all times. The live axle is distinguished from the more expensive differential axle, which uses a gear box to vary the rotational speeds of the rear wheels when the vehicle is turning and to reduce the rotational speed (and thus the driving force) on the inside wheel. Having a live axle makes cornering in either direction difficult because, at the high speeds travelled by the go cart, the rear wheels provide a significant driving force in the straight ahead direction. It is well known that the cornering ability of the go cart is improved when the driving force provided by the rear wheel on the side of the turn (i.e. the inside rear wheel) is reduced.

When the go cart enters a left hand turn, centrifugal force shifts the weight (particularly the upper body weight) of the driver to the right side of the cart. The weight shift in the rear of the cart is desirable because it puts extra weight on the right rear wheel (improving traction) while removing weight from the left rear wheel (reducing traction). The motor is usually mounted on the right side of the go cart to provide additional weight on the right rear wheel. If enough weight is lifted off the left rear wheel, it will lose traction completely and spin, enabling the right rear wheel alone to propel the go cart around the corner. However, because the seat is rigidly mounted to the chassis, the effect of the driver's weight shift normally is relatively small and there is little or no traction loss by the left rear wheel.

The weight shift of the driver when making a left turn also shifts weight from the left front wheel to the right front wheel. Since the front wheels do not support as much weight as the rear wheels, this weight shift from the left front wheel causes it to lose traction, thus reducing its ability to help steer the go cart. With only one front wheel (right) in solid contact with the surface of the track, cornering is made more difficult.

Recognizing that if two objectives can be accomplished a go cart with better left hand cornering ability can be achieved, at least one solution has been proposed in the prior art. The first objective is to design the go cart so that the right rear wheel provides a significantly greater driving force than the left rear wheel. The second objective is to design the go cart so that the left front wheel compensates for the weight shift to the right front wheel and provides at least some assistance in steering the go cart through a left turn.

The prior art solution is to provide a "stagger" adjustment to the go cart. The stagger adjustment attempts to add more weight to the left front wheel and the right rear wheel. One way to accomplish this is to use larger diameter tires at the left front position and the right rear position than in the other two tire positions. The larger tire has increased weight, which adds to the weight gain in the right rear portion of the chassis and compensates for the weight loss in the left front portion of the chassis. In addition, because the bigger tires have a larger circumference, the right rear wheel travels further than the left rear wheel on a single rotation, thus tending to turn the cart left at all times. Also, a larger circumference places more surface area of the left front tire into contact with the track than the right front tire, thus improving traction at the left front wheel. Another alternative that has been used is to simply increase the air pressure in the left front and right rear wheels. This tends to provide the same effect as using tires of increased diameters.

Using such a "stagger" adjustment works to some degree in helping the go cart to make high speed left hand turns. However, the conventional stagger adjustment has a serious drawback, in that the increased weight and/or diameter at the left front wheel and right rear wheel is a permanent adjustment. This has an adverse effect on steering the go cart on straight portions of the track (and when making right turns) because it tends to pull the cart to the left.

Accordingly, further advantages and improvements in go cart racing frames are needed.

SUMMARY OF THE INVENTION

Accordingly, it is a principal object of the present invention to improve upon a go cart racing frame.

It is an object of the present invention to provide a go cart racing frame that distributes the weight of the go cart evenly to both sides of the racing frame when the go cart is traveling straight ahead.

It is a further object of the present invention to provide a go cart racing frame that concentrates the weight of the go cart at selected corners of the racing frame when the go cart is making a turn.

It is a further object of the present invention to provide a go cart racing frame that assists in shifting weight from a selected corner of the racing frame when the go cart is making a left hand turn.

These objectives are accomplished by providing a racing frame, or chassis, with an independent seat frame rigidly connected to the chassis at a plurality of weight-bearing points and a stop member. The weight-bearing points are chosen so as to concentrate the weight of the driver at selected corners of the chassis. The stop member forms an additional weight-bearing point when a downward force is applied to the seat frame. This additional weight-bearing point helps to support the weight of the driver and distributes it to another corner of the chassis. However, the stop member permits upward movement of the independent seat frame when the downward force is withdrawn.

The designs of the go cart frames as disclosed herein have been tested and it has been observed that the go carts using the go cart frames of the subject invention are capable of negotiating left turns at higher speeds without detracting from top speeds that can be achieved in the straightaways. Although not wishing to be bound by theory, it is believed that the reason the subject go cart frames can travel faster is that the independent seat arrangement provides a stagger adjustment that comes into play only when the go cart is making a left turn. When making a left turn, the weight of the driver shifts and apparently is concentrated at the left front and right rear portions of the go cart (and ultimately to the left front wheel and right rear wheel), enabling it to handle left turns at higher speeds. However, since the stagger adjustment does not come into play unless the go cart is making a left turn, the go cart is substantially evenly balanced when it is travelling along straightaways, thus enabling it to be driven there at top speed.

In a preferred embodiment of the present invention, the go cart racing frame comprises a chassis with a right front portion, a left front portion, a right rear portion and a left rear portion and having left and right sides; an independent seat frame for supporting a seat; and seat frame flexure-restricting means for restricting downward movement of the seat frame with respect to the chassis. The independent seat frame is rigidly connected to the chassis at a plurality of weight-bearing points, wherein the weight-bearing points concentrate the weight of a driver positioned in the seat at the left front portion and right rear portion of the chassis, and the seat frame is sufficiently flexible to permit it to be flexed from an unflexed orientation downward to a location on the chassis. The restricting means forms an additional weight-bearing point when a downward force is applied to the seat frame, with the additional weight-bearing point helping to support the weight of the driver and distributing it to the left rear portion of the chassis. The restricting means allows upward movement of the seat frame to resume its unflexed orientation when the downward force is withdrawn.

In another preferred embodiment of the present invention, the present invention comprises a frame for a motorized vehicle to be operated by a driver, with the frame having a chassis with a right front portion, a left front portion, a right rear portion and a left rear portion and having left and right sides; an independent seat frame for supporting a seat; and seat frame restricting means for restricting downward movement of the seat frame with respect to the chassis. The independent seat frame is rigidly connected to the chassis at a plurality of weight-bearing points, wherein the weight-bearing points concentrate the weight of the driver positioned in the seat at two predetermined diagonally opposed portions of the chassis. The restricting means forms an additional weight-bearing point when a downward force is applied to the seat frame, with the additional weight-bearing point helping to support the weight of the driver and distributing it to the left rear portion of the chassis, and wherein the restricting means allows upward movement of the independent seat frame.

In yet another preferred embodiment of the present invention, a go cart comprises a chassis with a right front portion, a left front portion, a right rear portion and a left rear portion, and having left and right sides; a steerable front wheel assembly supported on the chassis; a steering mechanism supported on the chassis and operably connected to the front wheel assembly; driving means for driving the chassis, with the driving means including rear wheels disposed on opposite ends of a live axle and a motor for supplying power to the live axle; an independent seat frame for supporting a seat; a seat supported on the independent seat frame; and seat frame restricting means for restricting downward movement of the seat frame with respect to the chassis. The independent seat frame is rigidly connected to the chassis at a plurality of weight-bearing points, wherein the weight-bearing points concentrate the weight of the driver at the left front portion and right rear portion of the chassis. The restricting means forms an additional weight-bearing point when a downward force is applied to the seat frame, with the additional weight-bearing point helping to support the weight of the driver and distributing it to the left rear portion of the chassis, and wherein the restricting means allows upward movement of the seat frame.

These and other objects, aspects, features and advantages of the present invention will become apparent from the following detailed description of the preferred embodiments taken in conjunction with the drawings.

DESCRIPTION OF THE PREFERRED EMBODIMENT

Figure 2:
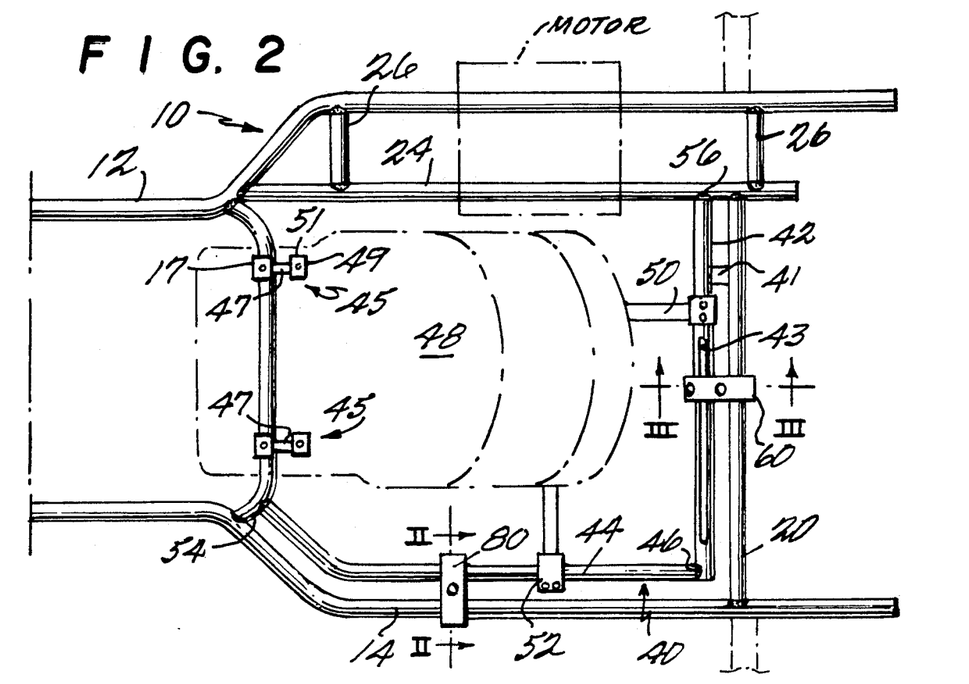
FIG. 2 is a partial top plan view of a go cart frame in accordance with one embodiment of the present invention.

FIG. 2 illustrates a fragmented view of a go cart racing frame in accordance with a preferred embodiment of the present invention. Generally, the racing frame comprises a chassis 10 and an independent seat frame 40. The chassis itself is conventional and thus is identified with the same reference numerals as used above in discussing FIG. 1.

Independent seat frame 40 comprises a rear seat frame member 42 and a side seat frame member 44. The rear and side seat frame members are rigidly connected together at corner 46. As shown in FIG. 2, the rear and side seat frame members are substantially straight, although the side seat frame member 44 does curve slightly to follow the contour of extended frame member 14. Rear seat frame member 42 includes an elongated rib 43 running along its outer surface for reasons that will be discussed below.

Figure 5:
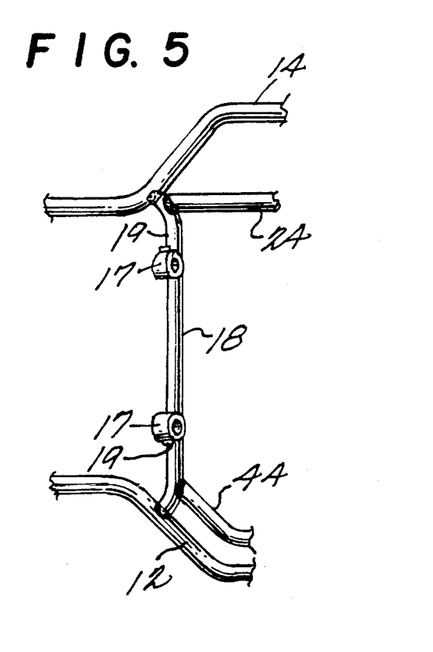
FIG. 5 is a partial perspective view of the go cart racing frame in accordance with the first embodiment.

A seat 48 is supported on independent seat frame 40 by rear seat support 50 and side seat support 52, both of which are clamped to the seat frame. The rear and side seat supports are adjustable along rear seat frame member 42 and side seat frame member 44, respectively, to allow the seat to be repositioned in the same manner as discussed above with respect to FIG. 1. The seat is aligned on the chassis by a seat alignment assembly 45, as shown in FIGS. 2 and 5. In the first embodiment, middle transverse frame member 18 has attached thereto two sleeves 17 with tightening means 19. The seat includes sleeves 49 and tightening means 51 for securing alignment shafts 47 therein. The shafts are also mounted in sleeves 17 on the middle transverse frame member to align the seat on the chassis. Although a portion of the driver's weight may be supported by middle transverse frame member 18 by virtue of the seat alignment assembly, most of the weight will be supported on side seat frame member 44 and rear seat frame member 42 of the independent seat frame.

In accordance with the present invention, independent seat frame 40 is rigidly connected to the chassis, e.g. by welding, at weight-bearing points 54 and 56. Rear seat frame member 42 is welded to motor-supporting member 24 at weight-bearing point 56, and side seat frame member 44 is welded to middle transverse frame member 18 at weight-bearing point 54. The weight-bearing points are selected so the weight supported by the independent seat frame, i.e. the weight of the driver, will be concentrated at selected portions of the chassis. More specifically, weight-bearing point 56 will distribute more weight to the right rear portion of the chassis and weight-bearing point 54 will distribute more weight to the left front portion of the chassis. This weight distribution will shift additional weight to the right rear wheel and left front wheel and introduce a stagger adjustment to the go cart racing frame. A gusset 41 is rigidly connected between rear transverse frame member 20 and rear seat frame member 42 to reduce the flexibility of the independent seat frame. However, gusset 41 can be eliminated to increase the flexibility of the independent seat frame and ultimately the effect of the weight shift of the driver. Thus, the gusset may be dispensed with if, for example, a relatively light weight driver is operating the go cart.

In accordance with the present invention, the stagger adjustment only comes into play when the go cart is making a left turn. This unique feature is provided by a flexure-restricting member used to help support the weight of the driver when the go cart is travelling along a straightaway or turning to the right. With reference to FIG. 2, flexure movement restricting member 60 (i.e., a stop member) is slidably connected to rear seat frame member 42 and rests on rear transverse frame member 20 to restrict downward flexure of independent seat frame 40 with respect to the chassis. Stop member 60 acts as a weight-bearing point when a downward force (i.e. the weight of the driver) is applied to independent seat frame 40. This helps support the weight of the driver (along with weight-bearing points 54 and 56) and distribute it to the left rear portion of the chassis. However, since stop member 60 is not rigidly connected to the chassis, but merely rests on rear transverse frame member 20, it does not restrict upward movement of the independent seat frame that tends to occur when the driver's weight shifts to the right. When this weight shift occurs, i.e. when making a left hand turn, stop member 60 can lift off the rear transverse frame member, making it no longer a weight-bearing point. Thus, and the driver's weight is only supported at rigidly connected weight-bearing points 54 and 56.

Figure 3:
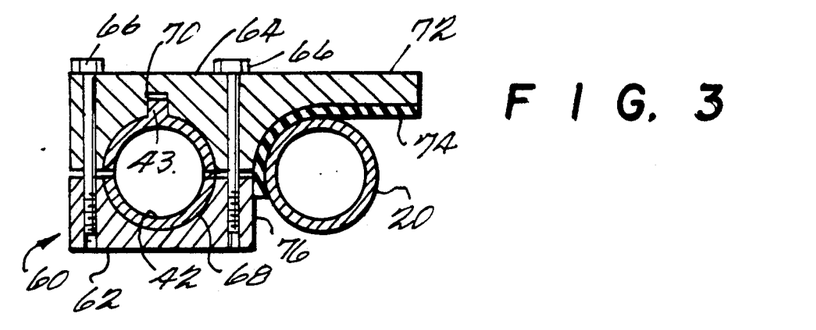
FIG. 3 is a cross-sectional view along line III—III in FIG. 2.

Details of stop member 60 are shown in FIG. 3. The stop member includes a first bracket element 62 and second bracket element 64 that are joined together by tightening means such as threaded bolts 66. The first and second bracket elements define an opening 68 through which rear seat frame member 42 fits. The opening 68 includes a key slot 70 for receiving rib 43 of the rear seat frame member. The rib and key slot arrangement prevents stop member 60 from rotating around the longitudinal axis of rear seat frame member 42. The first and second bracket elements of stop member 60 form a contoured submember 72 designed to rest on rear transverse frame member 20. A shock absorbing pad 74, made of a material such as rubber, can be attached to an underside 76 of the submember to absorb impacts between stop member 60 and rear transverse frame member 20 as seat frame 40 flexes up and down.

Although stop member 60 is shown in FIG. 2 to be secured to rear seat frame member 42, it could instead be attached to side seat frame member 44, in which case it would rest on extended frame member 14. Alternatives to stop member 60 are also within the scope of this invention, as long as they serve to restrict downward flexure of seat frame 40 with respect to chassis 10 without rigidly tying the frame and chassis together. For example, a similar stop member could be connected to the chassis, rather than to a seat frame member, and support independent seat frame 40 from below. Alternatively, a gusset could be rigidly connected to either the independent seat frame or the chassis to restrict downward flexure of the seat frame, or the independent seat frame and chassis could be shaped so that they overlap at some point to restrict downward movement of the independent seat frame.

Figure 4:
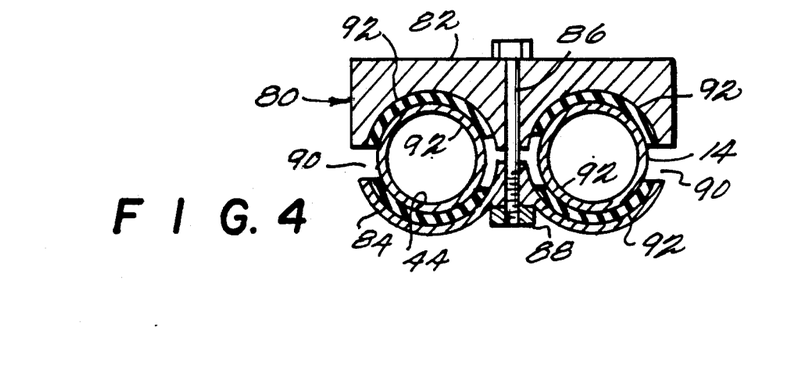
FIG. 4 is a cross-sectional view along line IV—IV in FIG. 2.

A further feature of the present invention is linking clamp 80, which can be seen in FIGS. 2 and 4. The linking clamp is attached to side seat frame member 44 and extended frame member 14 and assists in shifting the weight of the go cart away from the left rear portion of the chassis. Linking clamp 80 securely links these two frame members together but does not act as a weight-bearing point. The clamp only comes into play when the driver's weight shifts to the right and independent seat frame 40 is lifted upwardly. When this happens, extended frame member 14 is pulled in the direction of the independent seat frame. This further reduces the downward force on the left rear portion of the chassis, and thus the weight on the left rear wheel. The linking clamp is preferably used with lighter weight drivers because their weight shift alone may not be enough to reduce the weight on the left rear wheel to the point where it loses traction.

FIG. 4 illustrates the details of linking clamp 80. A first bracket piece 82 and a second bracket piece 84 are joined together by tightening means, such as a bolt 86 and nut 88 arrangement. When joined together, the first and second bracket pieces form two openings 90 for securing therein side seat frame member 44 and extended frame member 14. The openings are provided with shock absorbing pads 92 to absorb impacts between the linking clamp and the frame members.

Just as the location of stop member 60 can be varied, the position of linking clamp 80 can be changed from side seat frame member 44 to rear seat frame member 42. However, the linking clamp is intended to reduce the weight on the left rear wheel by lifting the left rear portion of the frame, and it should be positioned to accomplish this objective.

Figure 6:
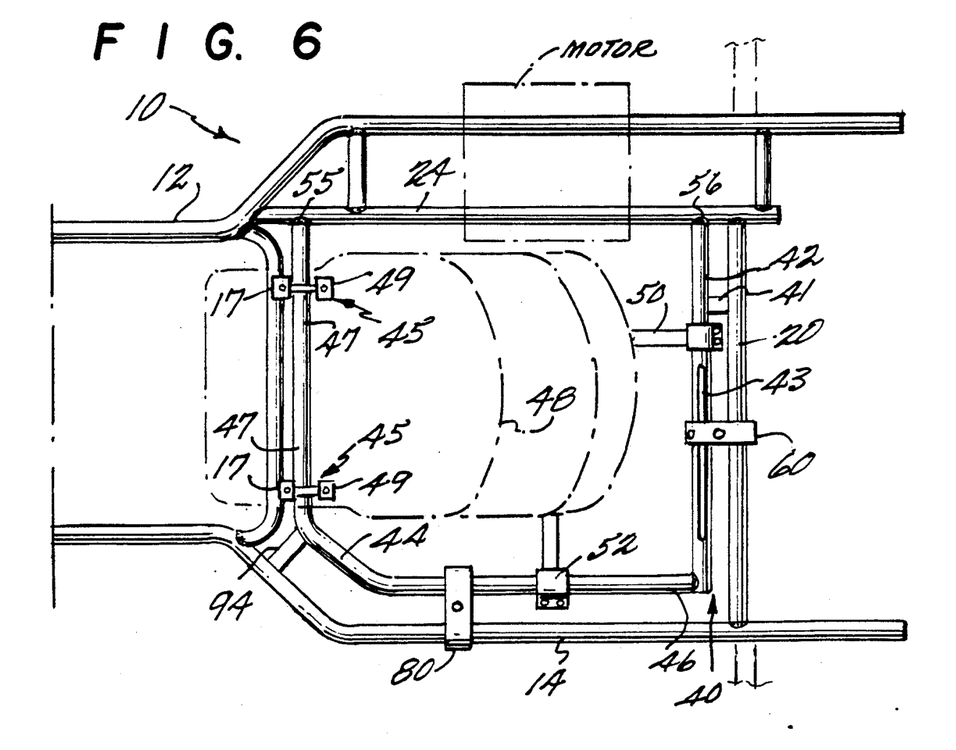
FIG. 6 is a partial top plan view of a go cart frame in accordance with a second embodiment of the present invention.

FIG. 6 shows a second embodiment of the go cart racing frame in accordance with the present invention. The second embodiment is similar to the first embodiment in most aspects, but differs in the shape of the independent seat frame 40. The independent seat frame has the same rear seat frame member 42 as shown in FIG. 2. However, side seat frame member 44' is extended into substantially an "L" shape and is rigidly connected to the right side of the chassis at weight-bearing point 55. In this arrangement, rear seat frame member 42 and side seat frame member 44' are rigidly connected to motor supporting member 24 at weight-bearing points 55 and 56. These weight-bearing points concentrate the weight of the driver at the right rear portion of the chassis. The rear and side seat frame members remain rigidly connected together at corner 46.

A gusset 94 is rigidly secured, e.g. welded, between side seat frame member 44' and extended frame member 14 to rigidly connect these frame members together. The gusset provides a third weight-bearing point, which concentrates the weight of the driver at the front left portion of the chassis. The second embodiment uses stop member 60 and linking clamp 80 in the same manner described above in the first embodiment to distribute and shift the weight of the driver.

Figure 7:
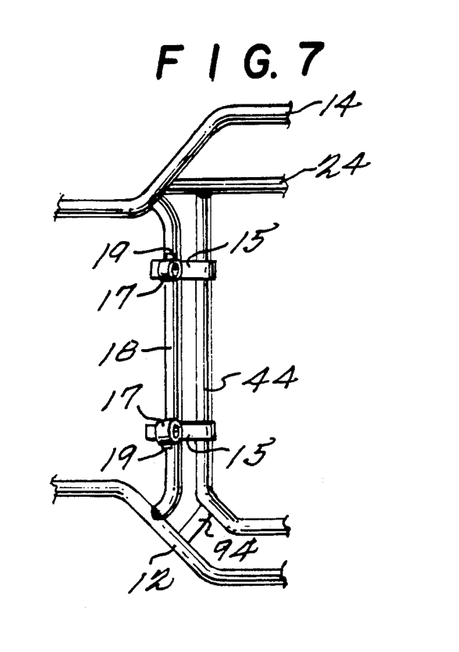
FIG. 7 is a partial perspective view of the go cart racing frame in accordance with second embodiment.

The second embodiment also differs from the first embodiment by providing the entire seat alignment assembly 45 on the independent seat frame. As shown in FIGS. 6 and 7, sleeves 17 are supported on brackets 15, which are rigidly fixed to side seat frame member 44'. Like the first embodiment, sleeves 49 attached to the underside of the seat secure alignment shafts 47 therein, and the shafts are inserted into cylinders 17 on the side seat frame member to align the seat. With the arrangement shown in FIG. 7, all of the driver's weight is supported on the independent seat frame.

Figure 8:
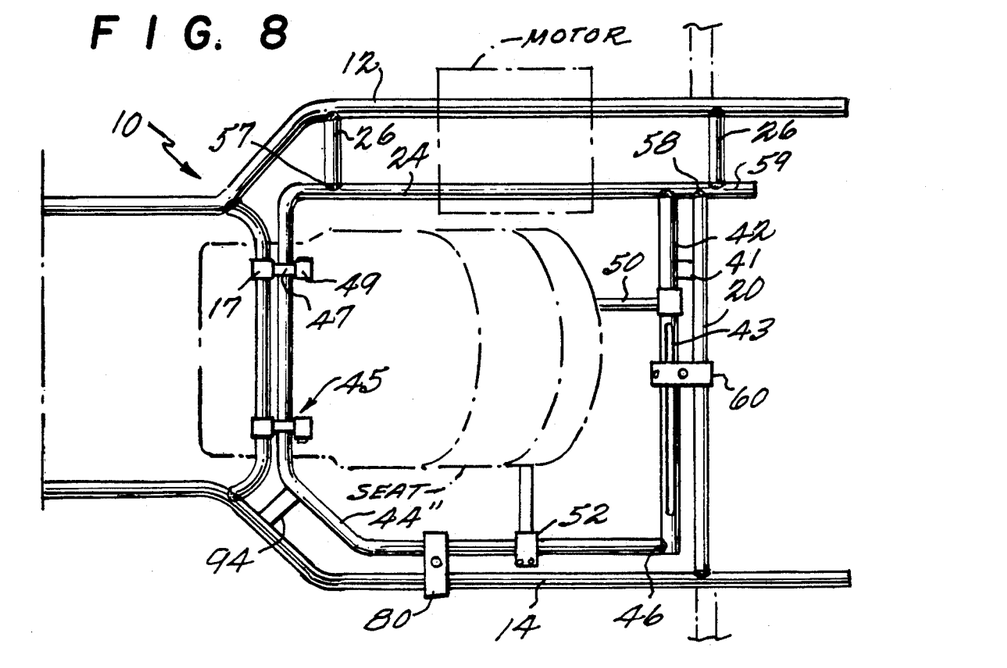
FIG. 8 is a partial top plan view of a go cart racing frame in accordance with a third embodiment of the present invention.

FIG. 8 shows a third embodiment of the go cart racing frame in accordance with the present invention. The third embodiment is similar to the first and second embodiments in most aspects, but differs in the shape of independent seat frame 40. The independent seat frame 40 has the same rear seat frame member 42 as shown in FIGS. 2 and 6. However, side seat frame member 44" is extended into substantially a "U" shape and is rigidly connected at three weight-bearing points 57, 58 and 59 on the right side of the chassis. The side seat frame member is connected to motor support brackets 26 at weight-bearing points 57 and 58 and connected to a right end of rear transverse frame member 20 at weight-bearing point 59. These weight-bearing points concentrate the weight of the driver at the right rear portion of the chassis. Because of the U-shape configuration of side seat frame member 44", the rear seat frame member is connected at both ends to the side seat frame member. Similarly to the second embodiment, a gusset 94 is rigidly secured at each end to side seat frame member 44" and extended frame member 14 to rigidly connect these frame members together. The gusset provides a fourth weight-bearing point which concentrates the weight of the driver at the front left portion of the chassis. The third embodiment uses stop member 60 and linking clamp 80 in the same manner described above in the first embodiment to distribute and shift the weight of the go cart.

The seat alignment assembly 45 is entirely supported on independent seat frame 40 and the seat is aligned on the independent seat frame in the same manner as in the second embodiment.

As will be appreciated, the first, second and third embodiments of the present invention differ from each other primarily in the shape of independent seat frame 40 and in the location of the weight-bearing points at which the seat frame is connected to the chassis. However, each embodiment achieves the objective of concentrating the weight of the driver supported by the independent seat frame at the left front portion and right rear portion of the chassis when the go cart is making a left turn. It will be understood by those skilled in the art that independent seat frame members of alternative shapes and rigidly connected to different portions of the chassis so as to distribute the weight of the driver as disclosed herein are within the scope of this invention.

Figure 9:
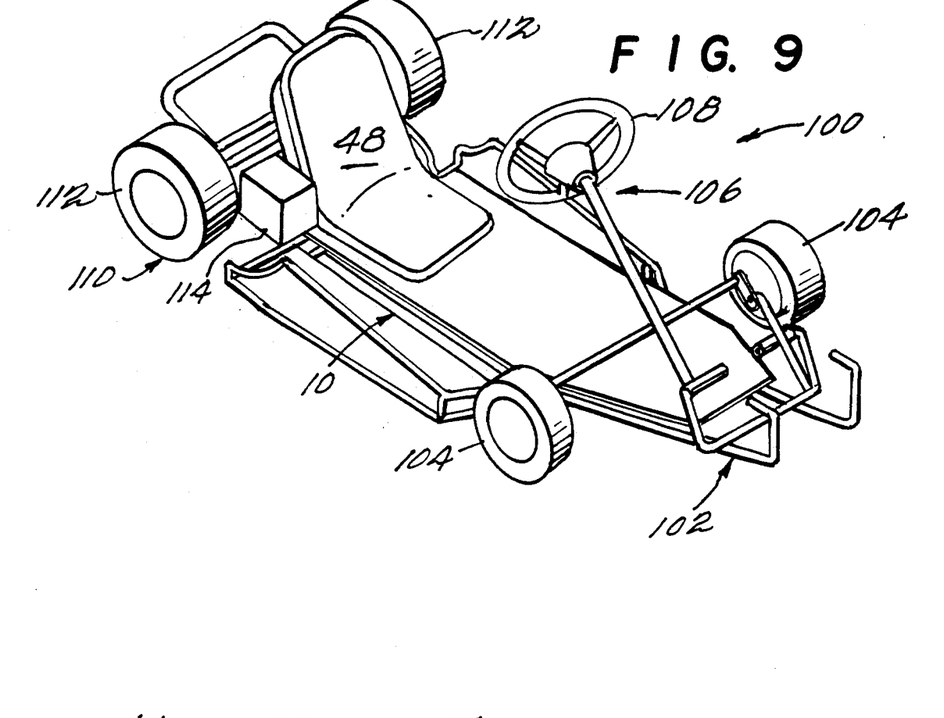
FIG. 9 is a perspective view of a go cart using a racing frame in accordance with the present invention.

FIG. 9 shows a go cart 100 incorporating the go cart racing frame of the present invention. As will be appreciated by those skilled in the art, besides the features of the present invention as discussed above in detail, the go cart is comprised of certain other components that are conventional. These include a steerable front wheel assembly 102 including front tires 104. The front wheel assembly is connected to a steering mechanism 106 have a steering wheel 108. The go cart is propelled by driving assembly 110, which includes rear wheels 112 and a power train (unshown) for transferring power from motor 114 to the rear wheels 112. The seat 48 is secured to independent seat frame 40 (restricted from view in FIG. 9 by the seat), which in turn is connected to the chassis 10 in the manner described above.

In operation, described with reference to the first embodiment shown in FIGS. 2-5, the go cart is first balanced to achieve a preferable weight distribution as discussed above. The design of the go cart normally provides a weight distribution of about 40% in the front of the go cart and 60% in the rear. With the driver positioned in the seat, adjustable stop member 60 is slid along rear seat frame member 42 to achieve the desired balance between the left and right sides of the chassis. As will be appreciated, the further the stop member is slid toward the left, the more the driver's weight will be shifted to the left side of the chassis. While a desired weight distribution from left wheels to right wheels may be 50/50, track conditions (e.g. wet or dry), track surfaces (e.g. dirt, asphalt, clay) and track characteristics (e.g. banked curves), as well as the driver's weight are all factors which must be considered in determining how to balance the go cart.

When a properly balanced go cart is traveling on a straightaway or making a right hand turn on the track, the weight of the is substantially evenly distributed on the chassis at weight-bearing points 54 and 56 and at the additional weight-bearing point where stop member 60 rests on rear transverse frame member 20. With the weight of the go cart evenly distributed in this manner, both rear wheels have substantially the same traction and drive the go cart forward with the same driving force.

When entering a left hand turn, however, the driver's weight (upper body weight in particular) shifts to the right side of the chassis due to centrifugal force. This weight shift reduces or eliminates completely the weight supported by stop member 60, since it is not connected to the chassis. Without support from the stop member, the driver's weight is distributed between the rigidly connected weight-bearing points 54 and 56. This creates a greater force on the left front portion and the right rear portion of the go cart. The greater force at the right rear portion allows the right rear wheel to drive the go cart while the left wheel loses traction and spins. The greater force at the left front portion helps the left front wheel to stay in solid contact with the ground and assists the right front wheel in steering the go cart.

To assist in reducing the weight on the left rear tire, linking clamp 80 can be attached as described above. When the centrifugal force raises or lifts independent seat frame 40, linking clamp 80 pulls on extended frame member 14 and actually lifts it upwardly to further reduce the traction of the left rear wheel.

Although specific embodiments of the present invention have been described above in detail, it will be understood that this description is merely for purposes of illustration. Various modifications of and equivalent structures corresponding to the disclosed aspects of the preferred embodiments in addition to those described above may be made by those skilled in the art without departing from the spirit of the present invention, which is defined in the following claims, the scope of which is to be accorded the broadest interpretation so as to encompass such modifications and equivalent structures.

What is claimed is:

1. A go cart racing frame, comprising:
   a chassis having a right front portion, a left front portion, a right rear portion and a left rear portion and having left and right sides;
   an independent seat frame for supporting a seat, said seat frame being rigidly connected to said chassis at a plurality of weight-bearing points, wherein said weight-bearing points concentrate the weight of a driver positioned in the seat at the left front portion and right rear portion of said chassis, said seat frame being sufficiently flexible to permit it to be flexed from an unflexed orientation downward to a location on said chassis; and
   seat frame flexure restricting means for restricting downward flexure of said seat frame with respect to said chassis and for allowing upward movement of said seat frame relative to said chassis, said means for restricting including a stop member having connecting means for non-rigidly connecting said seat frame to said chassis to allow movement therebetween and for forming an additional weight-bearing point when sufficient downward force is applied to said seat frame, with the additional weight-bearing point helping to support the weight of the driver and distribute it to the left rear portion of said chassis, wherein said restricting means allows upward movement of said seat frame to resume its unflexed orientation when said downward force is withdrawn.

2. A go cart racing frame according to claim 1, wherein said independent seat frame includes a rear member and a side member rigidly connected to each other at a corner.

3. A go cart racing frame according to claim 2 wherein said a stop member is adjustably connected to one of said seat frame members.

4. A go cart racing frame according to claim 3, wherein said stop member is adjustably connected to said rear member.

5. A go cart racing frame according to claim 4, wherein said stop member includes a first bracket element and a second bracket element defining an opening through which said rear member fits, with said first and second bracket elements being releasably joined by tightening means, and wherein said connecting means includes a weight-bearing submember having an underside for resting on said chassis.

6. A go cart racing frame according to claim 5, further comprising rotation-preventing means for preventing said stop member from rotating around said rear member.

7. A go cart racing frame according to claim 6, wherein said rotation preventing means includes a longitudinally running rib on said rear member, with said rib fitting in a complementary key slot in the opening defined in said stop member.

8. A go cart racing frame according to claim 7, wherein the underside of said weight-bearing submember is padded with a shock absorbing material.

9. A go cart racing frame according to claim 4, further comprising a linking clamp connected to one of said seat frame members and connected to said chassis so as to pull said chassis therealong when said seat frame member moves upwardly.

10. A go cart racing frame according to claim 9, wherein said linking clamp is connected to said side member and the left side of said chassis.

11. A go cart racing frame according to claim 10, wherein said linking clamp includes a first bracket piece and a second bracket piece defining two openings therebetween for receiving said chassis and said side member, and further including tightening means for releasably securing said first and second bracket pieces.

12. A go cart racing frame according to claim 4, further comprising a gusset rigidly connected between said rear member and the right rear portion of said chassis to reduce flexibility between said independent seat frame and said chassis.

13. A go cart racing frame according to claim 3, wherein said rear member is rigidly connected to the right side of said chassis and said side member is rigidly connected to the left side of said chassis.

14. A go cart racing frame according to claim 3, wherein said rear member is rigidly connected to the right side of said chassis and said side member is generally L-shaped and rigidly connected to the right side of said chassis, and further comprising a gusset rigidly connected between said side member and the left side of said chassis.

15. A go cart racing frame according to claim 3, wherein said side member is generally U-shaped and rigidly connected to the right side of said chassis, and said rear member is rigidly connected at both ends to said side member, and further comprising a gusset rigidly connected between said side member and the left side of said chassis.

16. A frame for a motorized vehicle to be operated by a driver, said frame comprising:
   a chassis having a right front portion, a left front portion, a right rear portion and a left rear portion and having left and right sides;
   an independent seat frame for supporting a seat, said seat frame being rigidly connected to said chassis bearing points concentrate the weight of the driver positioned in the seat at two predetermined diagonally opposed portions of said chassis; and
   seat frame restricting means for restricting downward movement of said seat frame with respect to said chassis and for allowing upward movement of said seat frame relative to said chassis, said means for restricting including a stop member having connecting means for non-rigidly connecting said seat frame to said chassis to allow movement therebetween and for forming an additional weight-bearing point when a downward force is applied to said seat frame, with the additional weight-bearing point helping to support the weight of the driver and distributing it to a corner portion of said chassis.

17. A frame according to claim 16, wherein said independent seat frame includes a rear member and a side member rigidly connected to each other at a corner.

18. A frame according to claim 17, wherein said stop member is adjustably connected to one of said seat frame members.

19. A frame according to claim 18, wherein said stop member is adjustably connected to said rear member.

20. A frame according to claim 19, wherein said stop member includes a first bracket element and a second bracket element defining an opening through which said rear member fits, with said first and second bracket elements being releasably joined by tightening means, and wherein said connecting means includes a weight-bearing submember having an underside for resting on said chassis.

21. A frame according to claim 20, further comprising rotation-preventing means for preventing said stop member from rotating around said rear member.

22. A frame according to claim 21, wherein said rotation preventing means includes a longitudinally running rib on said rear member, with said rib fitting in a complementary key slot in the opening defined in said stop member.

23. A frame according to claim 22, wherein the underside of said weight-bearing submember is padded with a shock absorbing material.

24. A frame according to claim 23, further comprising a linking clamp connected to one of said seat frame members and connected to said chassis so as to pull said chassis therealong when said seat frame member moves upwardly.

25. A frame according to claim 24, wherein said linking clamp is connected to said side member and the left side of said chassis.

26. A frame according to claim 25, wherein said linking clamp includes a first bracket piece and a second bracket piece defining two openings therebetween for receiving said chassis and said side member, and further including tightening means for releasably securing said first and second bracket pieces.

27. A frame according to claim 26, further comprising a first gusset rigidly connected between said rear member and the right rear portion of said chassis to reduce flexibility between said independent seat frame and said chassis.

28. A frame according to claim 27, wherein said rear member is rigidly connected to the right side of said chassis and said side member is rigidly connected to the left side of said chassis.

29. A frame according to claim 27, wherein said rear member is rigidly connected to the right side of said chassis and said side member is generally L-shaped and rigidly connected to the right side of said chassis, and further comprising a second gusset rigidly connected between said side member and the left side of said chassis.

30. A frame according to claim 27, wherein said side member is generally U-shaped and rigidly connected to the right side of said chassis, and said rear member is rigidly connected at both ends to said side member, and further comprising a second gusset rigidly connected between said side member and the left side of said chassis.

31. A go cart, comprising:
   a rigid chassis having a right front portion, a left front portion, a right rear portion and a left rear portion, and having left and right sides;
   a steerable front wheel assembly supported on said chassis;
   a steering mechanism supported on said chassis and operably connected to said front wheel assembly;
   driving means for driving said chassis, said driving means including rear wheels disposed on opposite ends of a live axle and a motor for supplying power to said live axle;
   an independent seat frame for supporting a seat, said seat frame being rigidly connected to said chassis at a plurality of weight-bearing points, wherein said weight-bearing points concentrate the weight of the driver at the left front portion and right rear portion of said chassis;
   a seat supported on said independent seat frame; and
   seat frame restricting means for restricting downward movement of said seat frame with respect to said chassis and for allowing upward movement of said seat frame relative to said chassis to remove a weight-bearing point, said means for restricting including a stop member having connecting means for non-rigidly connecting said seat frame to said chassis to allow movement therebetween and for forming an additional weight-bearing point when a downward force is applied to said seat frame, with the additional weight-bearing point helping to support the weight of the driver and distributing it to a left rear portion of said chassis.

32. A go cart according to claim 31, wherein said independent seat frame includes a rear member and a side member rigidly connected to each other at a corner.

33. A go cart according to claim 32, wherein said is stop member adjustably connected to one of said seat frame members.

34. A go cart according to claim 33, wherein said stop member is adjustably connected to said rear member.

35. A go cart according to claim 34, wherein said stop member includes a first bracket element and a second bracket element defining an opening through which said rear member fits, with said first and second bracket elements being releasably joined by tightening means, and wherein said connecting means includes a weight-bearing submember having an underside for resting on said chassis.

36. A go cart according to claim 35, further comprising rotation-preventing means for preventing said stop member from rotating around said rear member.

37. A go cart according to claim 36, wherein said rotation preventing means includes a longitudinally running rib on said rear member, with said rib fitting in a complementary key slot in the opening defined in said stop member.

38. A go cart according to claim 37, wherein the underside of said weight-bearing submember is padded with a shock absorbing material.

39. A go cart according to claim 34, further comprising a linking clamp connected to one of said seat frame members and connected to said chassis so as to pull said chassis therealong when said seat frame member moves upwardly.

40. A go cart according to claim 39, wherein said linking clamp is connected to said side member and the left side of said chassis.

41. A go cart according to claim 40, wherein said linking clamp includes a first bracket piece and a second bracket piece defining two openings therebetween for receiving said chassis and said side member, and further including tightening means for releasably securing said first and second bracket pieces.

42. A go cart according to claim 34, further comprising a gusset rigidly connected between said rear member and the right rear portion of said chassis to reduce flexibility between said independent seat frame and said chassis.

43. A go cart according to claim 39, wherein said rear member is rigidly connected to the right side of said chassis and said side member is rigidly connected to the left side of said chassis.

44. A go cart according to claim 39, wherein said rear member is rigidly connected to the right side of said chassis and said side member is generally L-shaped and rigidly connected to the right side of said chassis, and further comprising a gusset rigidly connected between said side member and the left side of said chassis.

45. A go cart according to claim 39, wherein said side member is generally U-shaped and rigidly connected to the right side of said chassis, and said rear member is rigidly connected at both ends to said side member, and further comprising a gusset rigidly connected between said side member and the left side of said chassis.

* * * * *